(12) United States Patent
Thompson et al.

(10) Patent No.: US 7,784,416 B2
(45) Date of Patent: Aug. 31, 2010

(54) SEED FIRMING ASSEMBLY AND METHOD FOR AGRICULTURAL SEEDERS AND MOUNTING SYSTEM THEREFOR

(76) Inventors: Keith D. Thompson, 934 S. 4th St., Osage City, KS (US) 66523; Benjamin K. Thompson, 934 S. 4th St., Osage City, KS (US) 66523

( * ) Notice: Subject to any disclaimer, the term of this patent is extended or adjusted under 35 U.S.C. 154(b) by 397 days.

(21) Appl. No.: 11/703,863

(22) Filed: Feb. 7, 2007

(65) Prior Publication Data

US 2008/0184920 A1    Aug. 7, 2008

(51) Int. Cl.
  A01C 5/00    (2006.01)
  A01C 13/00   (2006.01)
(52) U.S. Cl. ........................................ 111/194
(58) Field of Classification Search ............. 111/14, 111/190–193, 196, 194, 195
  See application file for complete search history.

(56) References Cited

U.S. PATENT DOCUMENTS

| | | | |
|---|---|---|---|
| 345,403 A | 7/1886 | Arnett | |
| 404,108 A | 5/1889 | Patric et al. | |
| 410,438 A | 9/1889 | Patric et al. | |
| 530,962 A | 12/1894 | Packham | |
| 939,812 A | 11/1909 | Davis | |
| 2,577,775 A | 12/1951 | Lemmon et al. | |
| 4,307,674 A | 12/1981 | Jennings et al. | |
| 4,760,806 A | 8/1988 | Bigbee et al. | |
| 5,398,625 A | 3/1995 | Johnson et al. | |
| 5,425,318 A | 6/1995 | Keeton | |
| 5,494,339 A | 2/1996 | Johnson et al. | |
| 5,673,638 A | 10/1997 | Keeton | |
| 5,676,429 A | 10/1997 | Johnson et al. | |
| 5,724,903 A | 3/1998 | Yoder et al. | |
| 5,826,524 A | 10/1998 | Yoder | |
| 6,119,608 A | 9/2000 | Peterson et al. | |
| 6,386,127 B1 | 5/2002 | Prairie et al. | |
| 6,945,182 B1 * | 9/2005 | Haukaas et al. | ............... 111/60 |
| 2004/0159271 A1 * | 8/2004 | Beaujot | ...................... 111/149 |

* cited by examiner

*Primary Examiner*—Christopher J. Novosad
(74) *Attorney, Agent, or Firm*—Jeffrey L. Thompson; Thompson & Thompson, P.A.

(57) ABSTRACT

A seed firming assembly and method for agricultural seeders includes a large diameter seed-firming wheel for firming seeds into soil at the bottom of a furrow. The seed-firming wheel is located immediately behind a furrow opener and a seed guide. The seed-firming wheel is rotatably supported by an attaching arm, which is pivotally attached to a planter subframe at a location behind the seed-firming wheel so as to push the seed-firming wheel in a forward direction during operation. The attaching arm has a forward portion on which the seed-firming wheel is rotatably supported, a rearward portion on which an extension spring is attached for imparting a downward force on the seed-firming wheel during operation, and a horizontal transverse axis of rotation located between the forward and rearward portions. An adjustment mechanism is provided for adjusting the downward force imparted on the seed-firming wheel by the spring.

20 Claims, 5 Drawing Sheets

SEED FIRMING ASSEMBLY AND METHOD FOR AGRICULTURAL SEEDERS AND MOUNTING SYSTEM THEREFOR

BACKGROUND OF THE INVENTION

1. Field of the Invention

The present invention relates generally to agricultural seeders that produce open furrows in the soil into which seeds are placed, and more particularly, to an improved seed firming wheel and method of attaching and operating said firming wheel for use with such seeders in securing seed-to-soil contact.

2. Description of the Prior Art

Agricultural planting methods continue to evolve in response to widespread adoption of "no-till" or "reduced-till" crop production techniques with greatly reduced dependence on tillage of the soil, and in which the next crop's seeds are often placed directly into the previous crop's stubble or crop residues. No-till or reduced-till seeding differs greatly from seeding into a tilled seedbed. The soil conditions for no-till seeding are typically wetter than those dried by tillage, due to the mulching effect of the crop residue remaining on the soil surface. No-till soils are also typically more structurally stable than tilled soils, as the soil particles are "aggregated" or held together by old roots, fungi, and other organic substances and molecular attractions binding the particles together.

The value of pressing newly planted seeds into the soil has likely been known since the dawn of agriculture, and in-furrow firming wheels were clearly described and depicted at least as early as 1908 in Davis, U.S. Pat. No. 939,812. Some earlier "presser" wheels are taught by Patric et al., U.S. Pat. No. 404,108, issued in 1889, although these firming devices were relatively wide and further rearward than the device described in Davis '812. These early firming devices also essentially allowed (and relied upon) considerable loose soil to slough into the furrow ahead of the firming device, and are more in the vein of a modern 'packer' or 'press' wheel operating upon the soil surface and compressing all of the soil filled over the seed. Arnett, U.S. Pat. No. 345,403, issued in 1886, in describing a down-force system of dead weights for drill openers because "machines of this type, which are commonly operated on unplowed sod-land . . . " [lines 18-19], also depicts press wheels "for the purpose of closing the furrow and covering the seed" [lines 47-48] which were apparently intended to also achieve seed firming to some extent. The different methods and actions of such wheels on freshly formed furrows and planted seeds becomes still more important in no-till conditions due to the greater structure or resilience of no-till soils as compared to tilled soils, which renders pressing from the soil surface ineffective and damaging to the seed environment. Soils which are eroded or which have otherwise suffered degradation from tillage, as well as soils that naturally have high clay content and/or low organic matter content, will be more susceptible to damage from excessive pressing above the seed, especially when those soils are damp.

In no-till seeding, the wetter and more structured soils generally prevent press wheels on the soil surface from performing the seed-firming and furrow-closing functions adequately. The sidewall of the furrow formed in no-till seeding does not crumble easily as does the sidewall in tilled conditions, where the soil had previously been loosened and fluffed by tillage. Accordingly, very high pressures are sometimes applied to the packing or closing wheels in an attempt to squeeze the furrow sidewalls back together. This typically results in poor seedling emergence because the soil in the furrow is more compressed at the surface compared to soil near the seed, sometimes to the extent of having a void immediately above the seed but with extremely compressed soil at the surface. In this instance, seed germination may fail due to the drying of air in the void, or the seedling may leaf underground in the void, or the seedling will encounter great difficulty pushing itself through the dense layer of soil, which will slow and weaken the seedling or even kill it.

Some improvements have been made by separating the seed firming and furrow closing functions. This is typically only possible where the depth-gauging function is already accomplished independently of the packing or closing wheel, as in the configuration where depth-gauging wheels travel alongside the furrow opening discs. Seeds are firmed into the soil in the bottom of the furrow by a narrow rolling wheel or sliding-type firmer exerting a relatively small amount of pressure onto the seed after it has been placed by the furrow openers and seed-directing tube.

The lineage of rolling in-furrow firming wheels extends down through the years, including firming wheels affixed to the opener subframe so as not to move during field operation (as taught by Lemmon, U.S. Pat. No. 2,577,775, and Jennings et al., U.S. Pat. No. 4,307,674), firming wheels suspended from a closing frame, and firming wheels such as Davis '812 wherein the wheel and trailing attaching arm is free to pivot vertically and urged downward by a spring tensioning device (such as further taught by Yoder et al., U.S. Pat. Nos. 5,826, 524 and 5,724, 903; and by Johnson et al., U.S. Pat. Nos. 5,398,625, 5,494,339, and 5,676,429). Some of the small-diameter (e.g., 5-inch diameter) firming wheels, such as envisioned by Yoder and Johnson, did in reality encounter numerous difficulties in field operation including mud and stubble accumulation near the wheel's axis of rotation and including the juncture with the attaching arm. Other difficulties have ensued with the attaching arm and spring apparatus being located between (on "double-disc" designs) the furrow-opening blades and gauge wheels, which contributes to mud and straw accumulation, as well as making awkward the adjustment and service of the attaching arm and spring. Most of the planter models sold in North America in the last 30 years have subframes that extend rearward of the opener blades and gauge wheels, preventing the simple installation of large-diameter firming wheels in close proximity to the blades.

As compared to small firming wheels, the large-diameter (9-or 10-inch) firming wheels of appropriately narrow construction have encountered considerably more success, such as what is taught by Bigbee (U.S. Pat. No. 4,760,806) and improved by Prairie et al. (U.S. Pat. No. 6,386,127), embodied in the firming wheels of the John Deere 50, 60, and 90-series models of single-disc opener grain drills and in the Case-New Holland SDX series of drills, respectively. These prior art designs utilize a firming wheel mounting that enables the wheel and attaching arm to pivot vertically from the upper or forward end of the attaching arm, such that the wheel is able to move independently of the opener. In this way, the wheel and arm are trailing from the radial pivot point. Trailing arms generally require substantial pressure to ensure sufficient firming action by the firming wheel, and often are further rearward than desired, due to the necessities of clearance for the arc of travel of the firming wheel during field operation.

Virtually none of the planter models currently marketed in North America employ large-diameter in-furrow firming wheels (or any in-furrow firming device at all), apparently because packing the soil from the surface downward is perceived as adequate by the currently dominant tilled-seedbed market. However, small-diameter (approximately 5-inch)

"seed-lock" firming wheels, and the attaching mechanisms from which the wheel trails, have at various times been sold in the North American markets by both OEM planter manufacturers (Kinze, J D, Great Plains, AGCO White) as well as aftermarket suppliers (Yetter, J S Ag Innovations). These small-diameter wheels were quite popular for a few years in the mid-1990s, until the realization that plugging with mud and crop residues was a serious problem.

Sliding seed-firming devices also have a long history, appearing (but not described) in 1889 in Patric et al. '108, although as previously discussed, the device was neither shaped nor positioned to function in the furrow proper, but rather the device would likely operate in the vestiges of the furrow and on top of considerable loose "fill" soil that had sloughed back into the furrow after the opener blades had passed, and the relatively wide Patric firming device itself would likely tend to drag still more soil into the furrow with its forward end as it slid. The "presser-foot" is further depicted in Patric et al., U.S. Pat. No. 410,438, and in Packham, U.S. Pat. No. 530,962. More recent inventions have been true in-furrow sliding firming devices, such as described in Keeton, U.S. Pat. Nos. 5,425,318 and 5,673,638, as well as Peterson et al., U.S. Pat. No. 6,119,608. Many of these sliding firming devices are hindered in their performance by mud or damp soil accumulation on the lower edges, especially if some soil disturbance occurs ahead of the firming device so that it no longer is operating in a 'clean' cut, or if insufficient pressure is applied to the sliding firming device. Soil accumulation on the underside of the firming device can result in dragging of seeds, and in a poor firming action. Sliding firming devices may also exhibit rapid wear in many soil conditions, unless made from exotic materials.

SUMMARY OF THE INVENTION

After extensive field testing, the Applicants developed an improved seed-firming wheel linkage which is the subject of the present invention. The seed-firming wheel linkage of the present invention solves the mechanical problems of fitting a large-diameter in-furrow firming wheel in close proximity to the opener blades on various seeder opener designs, especially modern double-disc planter designs. The present design provides improved clearance of mud and crop residues, allows easier access for service and adjustment of the linkage, and also allows a reduction in spring pressure urging the firming wheel downward since the wheel is pushed instead of pulled.

The Applicants' invention utilizes a large-diameter firming wheel with a narrow tapered edge to allow it to fit into the bottom of the furrow "V," with the wheel preferably manufactured of a flexible rubber material across much of its diameter to allow substantial flexing and thereby permitting the wheel to track the furrow effectively while seeding on slight contours. The firming wheel is rotatably attached to a stem or arm, which extends forward from a point on the opener subframe rearward of the firming wheel itself, such that the wheel is pushed rather than pulled. The arm pivots on a shaft horizontal to the soil surface and transverse to the direction of travel. Preferably, the wheel is biased downwardly so as to keep the wheel engaged in the soil at all times and to supply additional firming action by it. The downward bias is accomplished by spring pressure on the arm.

Rearward of the firming wheel are closing wheel(s), which are attached on separate supporting arm(s) to allow pivoting upward by the wheel(s).

The Applicants' invention provides a method whereby the firming wheel can be located in close proximity to the furrow opening blades, gauge wheels, and seed-drop tube. This arrangement allows the pivot point of the firming wheel to be more accessible for service, allows the firming wheel to better track the furrow while planting on the contour, and requires little vertical travel for the firming wheel due to its proximity to the depth gauging wheels.

This arrangement also allows for the portion of the arm(s) passing alongside the firming wheel to the wheel's rotatable axis to be located further laterally from the wheel's side(s), which would otherwise be constrained by the relatively narrow space between the opener blades and gauge wheels. Having sufficient clearance between the wheel and the arm passing alongside the wheel allows mud and straw to pass freely as these will on occasion be directed into this juncture by the firming wheel's rotation, and by the dynamic of the other planter components travelling through a stalk- or stubble-strewn field.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Improved in-furrow seed firming wheels for agricultural seeders according to preferred embodiments of the present invention will now be described in detail by reference to FIGS. 1 to 5 of the accompanying drawings.

Figure 1:
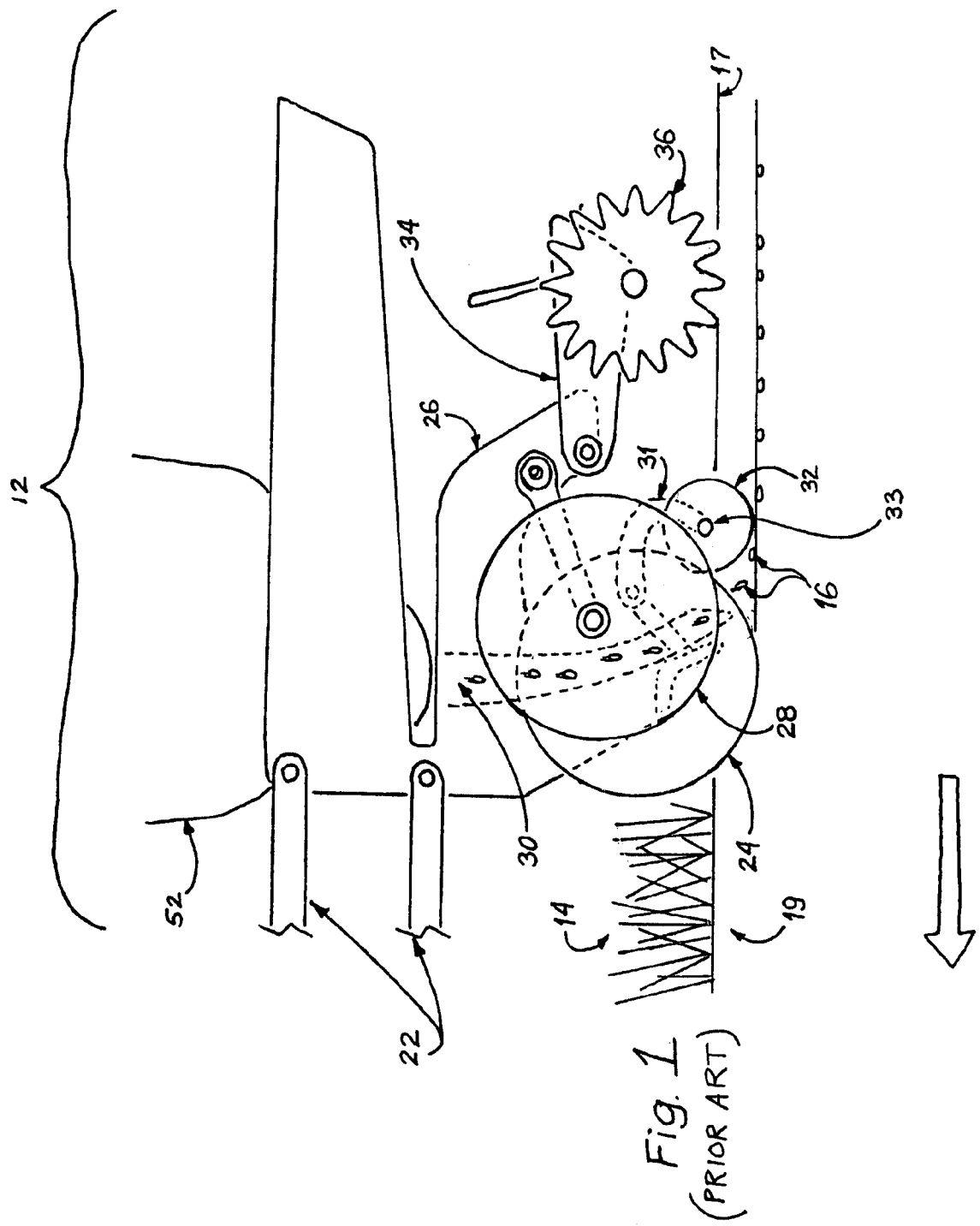
FIG. 1 is a side view of a row unit for an agricultural planter with prior art firming wheel and attaching mechanism.

FIG. 1 is a side view of a common planter opener unit 12, utilizing a prior art seed firming and closing system. The planter opener unit 12 is attached to the frame or toolbar of the planter by means of a parallel linkage 22 with springs or other devices (not shown) for supplying down-pressure to penetrate the previous crop residues 14 and soil 19. The planter opener unit 12 employs two opener discs 24 that are rotatably mounted to an opener subframe 26 for creating a furrow. The opener discs 24 are in contact with each other at the lower leading edge but slightly gapped at the upper and rearward edges to allow a seed-directing tube 30 to pass between them. The tube 30 guides seeds 16 to the bottom of the furrow. Planter opener units usually have two depth-gauging wheels 28, one alongside each opener disc 24. A seed hopper 52 is also shown which carries a supply of seed to be delivered to the furrow through the seed tube 30.

A small-diameter seed-firming wheel 32 on the planter opener unit 12 performs the function of firming the seeds 16 into the soil comprising the furrow bottom. Alternatively, sliding firmers (not shown) are sometimes used to perform this function (note that in some configurations the separate firming mechanism is omitted—both the firming and closing functions are performed by smooth or tined closing wheels operating alongside the furrow which compress the sidewall downward starting from the soil surface; however, this method usually performs poorly in no-till). The firming wheel 32 is rotatably attached to the planter opener subframe by an arm 31 which pivots at its forward end to allow the arm and wheel to move vertically in response to minor variations in furrow depth and undulating terrain. The wheel 32 and arm 31 have considerable upward travel to prevent damage when traversing small gullies or passing over rocks or other obstacles.

The firming wheel has an axle 33 that is low to the soil surface 17 due to the relationship between the wheel diameter and the depth of planting, which is commonly in the range of 1.0 to 2.5 inches. The axle 33 and juncture with arm 31 tend to accumulate mud and previous crop residues 14 during field operation. The arm 31 passes in relatively close proximity alongside the edge of wheel 32 due to space constraints imposed by the gauge wheels 28 and opener blades 24 as well as the necessity of positioning the wheel 32 as far forward as possible to maintain some semblance of alignment when seeding on the contour, and to allow clearance of the wheel 32 in relation to the opener subframe 26 as the wheel 32 and arm 31 pivot upward significantly to clear obstacles during field operation. The substantial upward travel capability of the wheel 32 is also necessary to prevent damage to the apparatus holding the forward end of the arm 31 and securing it to the forward portion of the opener subframe 26 between the blades 24. The robustness of this apparatus is constrained by the space between the blades 24 and alongside the seed tube 30 and is further compromised by the leverage that the wheel 32 and arm 31 can exert on these components while in field operation. Firming wheel 32 diameter is also constrained by the clearance issues involved during vertical pivoting.

Rearward of the firming wheel 32, the closing wheels 36 are mounted from a unibody bracket 34 which has the ability to pivot vertically and radially about a single point located on a subframe of the opener unit 12 immediately rearward of the opener discs 24.

Figure 2:
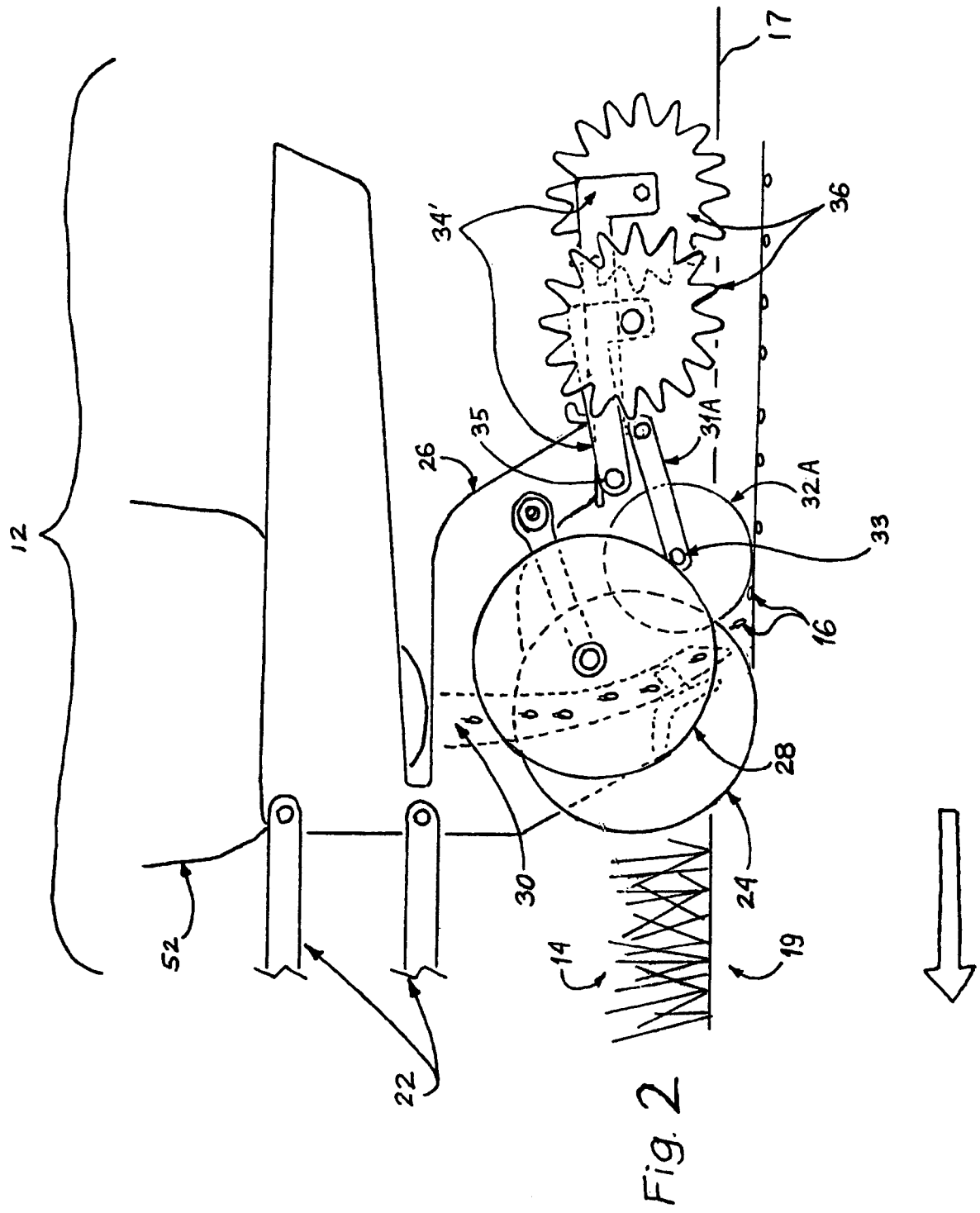
FIG. 2 is a side view of the same row unit as FIG. 1, with a larger firming wheel and 'pushed' linkage according to the present invention, and closing wheels on independent arms.

FIG. 2 is a side view of a planter unit according to an embodiment of the Applicants' invention. The same reference numerals are used in FIG. 2 to depict various components that correspond to those shown in FIG. 1. In this embodiment, the diameter of the firming wheel 32A is substantially greater, so that the axle 33 remains well above the soil surface 17 and clear of mud and crop residues 14 during normal seeding operations (i.e., planting depths of 1 to 3 inches). The firming wheel 32A has a narrow tapered edge to allow the wheel to fit into the bottom of a furrow, and a flexible portion that permits the wheel to flex and track the furrow effectively while seeding on contours.

Figure 3:
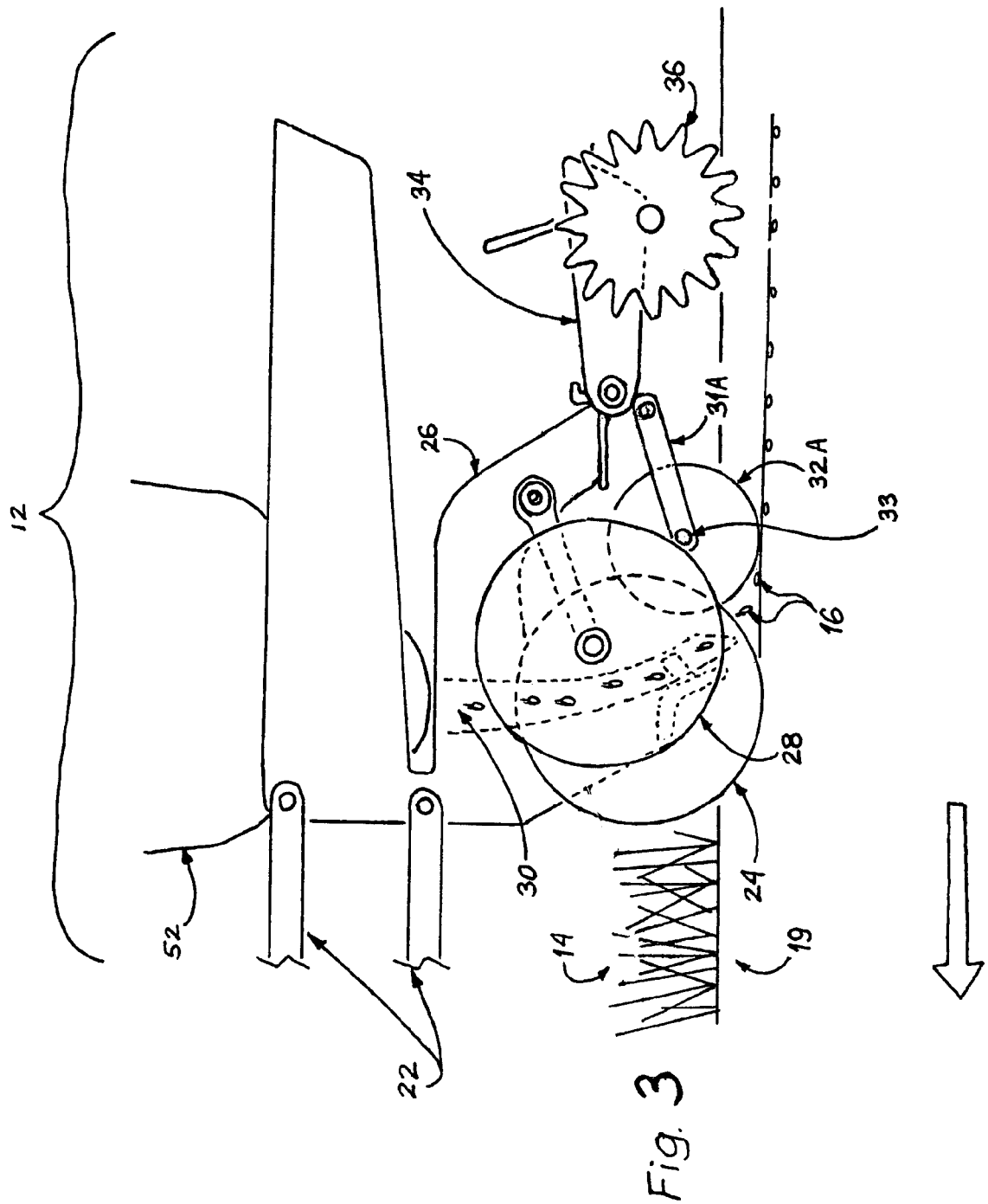
FIG. 3 is a side view of a row unit as in FIG. 2, with a larger firming wheel and 'pushed' linkage according to the present invention, and closing wheels on a single bracket.

The attaching arm(s) 31A rotatably support the seed-firming wheel 32A and are pivotally attached to the planter subframe 26 behind the seed-firming wheel 32A so that they push, instead of pull or draw, the seed-firming wheel 32A in a forward direction during operation. The furrow opener discs 24 are pivotally attached to the planter subframe 26 at a location in front of the seed-firming wheel 32A. A front portion of the seed-firming wheel 32A is disposed between the opener discs 24 during operation, as shown in FIGS. 2 and 3. This configuration makes installation and serviceability much easier, reduces stress on the front of the subframe 26, requires less spring pressure on the arm(s) 31A, and allows the arm(s) 31A to pass alongside the firming wheel 32A at a greater lateral distance from the surface of the firming wheel 32A to facilitate self-clearing of mud and debris that might otherwise accumulate in the axle 33 area and the juncture of the axle 33 and the arm(s) 31A.

Rearward of the firming wheel 32A are the closing wheels 36 for closing the furrow. The closing wheels 36 are mounted to independent attaching arms 34' which each have the ability to pivot radially at their attachment point to the opener subframe 26, and may be downwardly biased by spring pressure or other means.

FIG. 3 is a side view of a planter unit according to another embodiment of the Applicants' invention. This embodiment differs from that depicted in FIG. 2 in the arrangement of the closing wheels 36. Here, the closing wheels 36 are on a unibody bracket 34, which pivots radially at its attachment point to the opener subframe 26. Other components are the same as those labeled and described in conjunction with FIG. 2.

Figure 4:
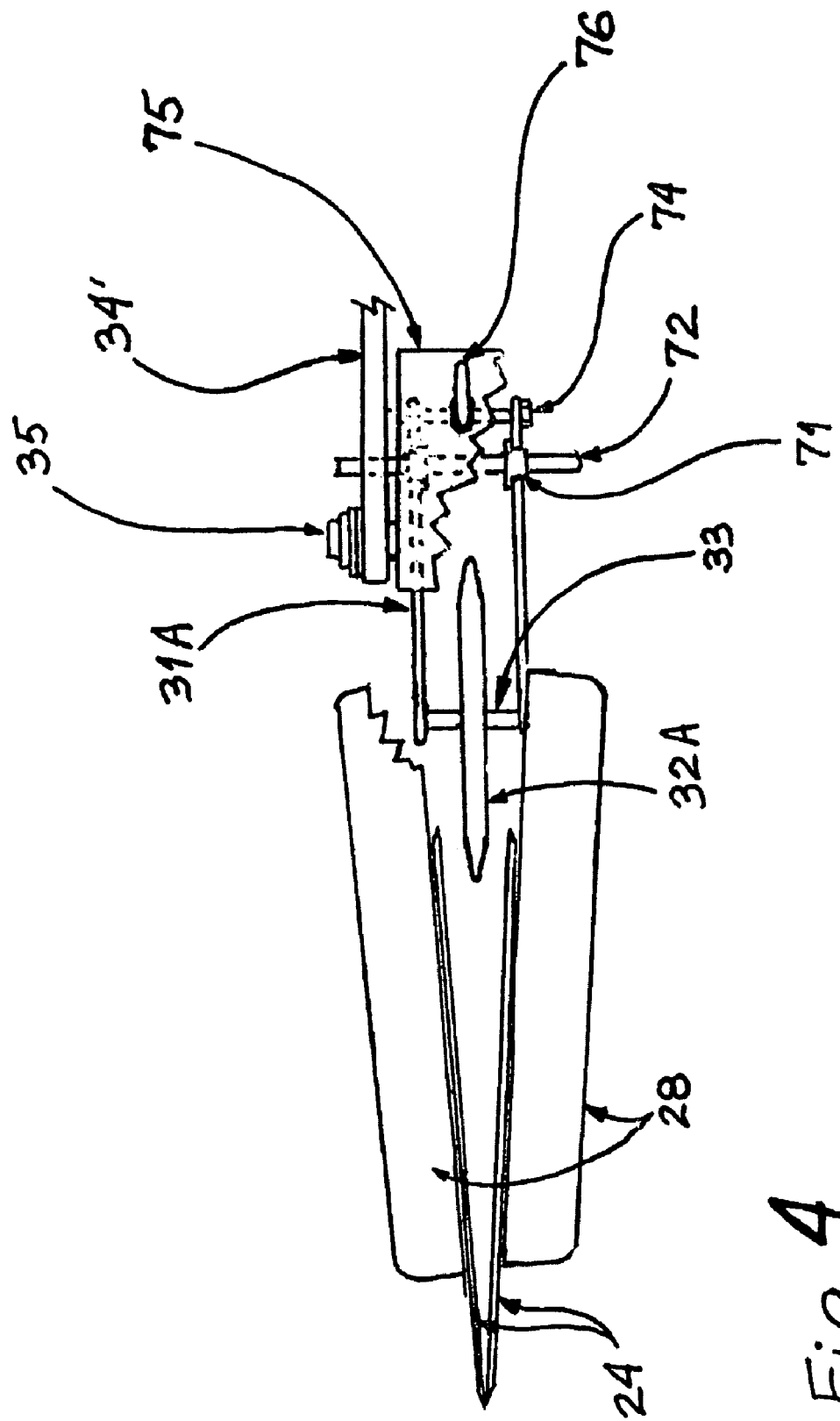
FIG. 4 is a top plan view of a portion of the row unit shown in FIG. 2.

FIG. 4 is top plan view of a planter row unit opener of the same design as in FIG. 2. The same reference numerals, letters, and symbols are used in FIG. 4 to depict various components that correspond to those shown in FIG. 2. Additionally, a cutaway view of the attaching plate 75 (largely obscured in previous figures) is shown, which attaches to the trailing portion of the subframe 26 in the location previously accommodating the attachment of the unibody closing wheel frame 34 as in FIG. 1. Attaching plate 75 is affixed to a shaft 72 which forms the axis of rotation for the firming wheel attaching arms 31A. The axis of rotation of the attaching arm(s) 31A is horizontal to the soil surface and transverse to the direction of travel. As seen in FIG. 4, a pair of attaching arms 31A are used, and the seed-firming wheel 32A is rotatably supported in the space between the arms 31A such that a large gap exists between the outer surface of the wheel 32A and the inner surface of each arm 31A, preferably a gap of approximately one inch or more. Inserted into the attaching arms 31A are hat bushings 71 that fit loosely over the shaft 72. The arms 31A are secured to each other by a bolt through the firming wheel axle 33 and also by a bolt 74 at the rearward edge of the arms 31A. Thus, the hat bushings are 'sandwiched' or contained, and need no further securing. Plate 75 also holds a new pivotal attaching point 35 for the closing arms 34'.

Figure 5:
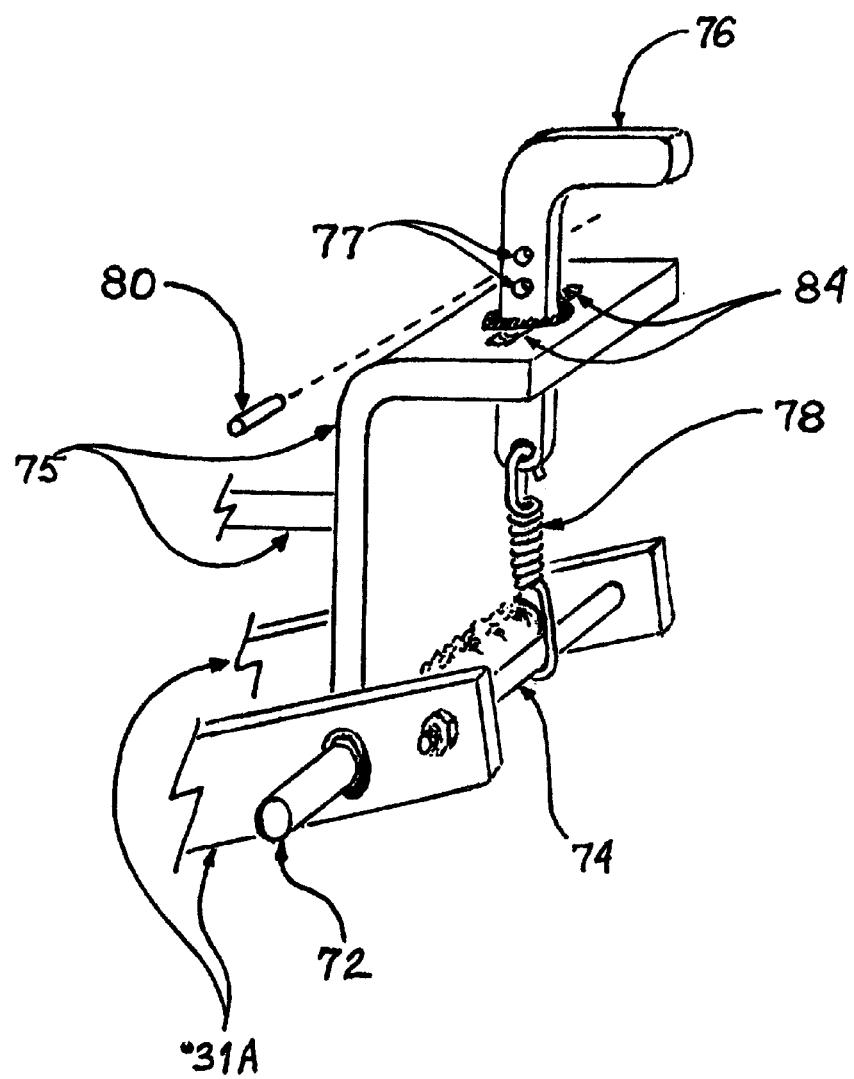
FIG. 5 is a side elevational view of the tensioning device for the firming wheel linkage according to the present invention.

FIG. 5 is a side elevation view of the spring tensioning device and adjustment thereof for the firming wheel attaching arms 31A and firming wheel 32A (the firming wheel 32A is shown in FIGS. 2 to 4). As seen in FIG. 5, the attaching arm(s) 31A have a forward end portion on which the seed-firming wheel 32A is rotatably supported on the axle 33, a rearward portion on which an extension spring 78 is attached to the bolt 74 for imparting a downward force on the seed-firming wheel 32A during operation, and an axis of rotation formed by the shaft 72 located between the forward and rearward portions. The bolt 74 holds the lower hook of the extension spring 78. The extension spring 78 extends upward from the lower hook. An upper hook of the extension spring 78 is inserted into the lower end of a sliding handle 76, which provides an adjustment mechanism for the spring 78. The handle 76 is adjustable by vertical sliding, and secured by a pin 80 in any of a plurality of holes 77 in the handle 76. The pin 80 becomes seated into a transverse recess 84 in the plate 75 and is held in place by constant spring tension from the extension spring 78.

The spring 78 pulls upward on the arms 31A rearward of their pivot point on the shaft 72, thereby biasing the forward ends of the attaching arms 31A and the firming wheel 32A downward.

Although the handle 76 is shown in FIG. 5 as an L-shaped member, it should be understood that a T-shaped handle or other suitable structure can be used to improve the ease of gripping the handle during adjustment.

The spring 78 can be an extension spring as shown in FIG. 5. Alternatively, other types of biasing means for applying pressure to the attaching arms 31A can be used instead of an extension spring, including rubber straps, gas-filled cylinders, shock absorbers, and so forth.

In another alternative, the attaching arms 31A for the firming wheel 32A can have their pivot point located at the most rearward point of the attaching arms 31A instead of between the front and rear ends as shown in the illustrated embodiment. In this case, the biasing means for applying downward pressure can be in the form of a compression spring or gas-filled cylinder or the like that pushes down on the attaching arms 31A forward of the pivot point.

The seed firming assembly of the present invention is particularly suitable for use in no-till and reduced-till planting systems because of its ability to clear mud and crop residues. However, the assembly will also work well in tilled soil and can be adjusted easily to accommodate different seeding conditions by using the adjustment mechanism for the spring 78 described above.

While the invention has been specifically described in connection with specific embodiments thereof, it is to be understood that this is by way of illustration and not of limitation, and the scope of the appended claims should be construed as broadly as the prior art will permit.

What is claimed is:

1. A seed firming assembly for agricultural seeders, comprising:
    a seed-firming wheel for firming seeds into soil at the bottom of a furrow created by a furrow opener; and
    an attaching arm that rotatably supports said seed-firming wheel in said furrow behind the furrow opener; said attaching arm having a forward portion on which the seed-firming wheel is rotatably supported, said attaching arm being pivotally attached to a planter subframe for pivotal movement about an axis of rotation located behind the seed-firming wheel so as to push the seed-firming wheel to roll along the bottom of the furrow in a forward direction during operation while allowing the forward portion of the attaching arm and the wheel to move vertically relative to the planter subframe about said axis of rotation in response to variations in furrow depth and undulating terrain.

2. The seed firming assembly according to claim 1, wherein said seed-firming wheel is rotatably mounted on an axle attached to a forward end portion of the attaching arm.

3. The seed firming assembly according to claim 2, wherein said seed-firming wheel has a diameter that allows the axle to remain above a soil surface during operation.

4. The seed firming assembly according to claim 1, wherein said attaching arm has a rearward portion on which an extension spring is attached for imparting a downward force on the seed-firming wheel during operation, and said axis of rotation is located between said forward and rearward portions.

5. The seed firming assembly according to claim 4, wherein said axis of rotation of the attaching arm is horizontal and transverse to a forward direction of travel of the seed firming assembly.

6. The seed firming assembly according to claim 1, further comprising a means for biasing the attaching arm in a direction that imparts a downward force on the seed-firming wheel during operation, and an adjustment mechanism for adjusting the downward force imparted by the biasing means.

7. The seed firming assembly according to claim 1, wherein said attaching arm comprises a pair of arms that are spaced apart with the seed-firming wheel rotatably supported therebetween.

8. The seed firming assembly according to claim 1, wherein said seed-firming wheel has a tapered edge to allow the wheel to fit into the bottom of a furrow, and a flexible portion that permits the wheel to flex and track the furrow effectively while seeding on contours.

9. A planter unit for an agricultural seeder, comprising:
    a furrow opener;
    a seed guide for guiding seeds into a furrow created by the furrow opener; and
    a seed-firming wheel located behind the seed guide and arranged to roll along the bottom of the furrow created by the furrow opener for firming seeds into soil at the bottom of the furrow, said seed-firming wheel being rotatably supported by a forward portion of an attaching arm which is pivotally attached to a planter subframe for pivotal movement about an axis of rotation located behind the seed-firming wheel so as to push the seed-firming wheel in a forward direction during operation while allowing the forward portion of the attaching arm and the seed-firming wheel to move vertically relative to the planter subframe about said axis of rotation in response to variations in furrow depth and undulating terrain.

10. The planter unit according to claim 9, wherein said furrow opener is mounted to a planter subframe at a first location, and said attaching arm is pivotally attached to the planter subframe at a second location behind said first location.

11. The planter unit according to claim 9, wherein said furrow opener comprises two opener discs rotatably mounted to the planter subframe, and a front portion of said seed-firming wheel is disposed between said opener discs during operation.

12. The planter unit according to claim 9, wherein said seed-firming wheel is rotatably mounted on an axle attached to a forward end portion of the attaching arm.

13. The planter unit according to claim 12, wherein said seed-firming wheel has a diameter that allows the axle to remain above a soil surface during operation.

14. The planter unit according to claim 12, wherein said attaching arm has a rearward portion on which an extension spring is attached for imparting a downward force on the seed-firming wheel during operation, and said axis of rotation is located between said forward and rearward portions.

15. The planter unit according to claim 14, wherein said axis of rotation of the attaching arm is approximately horizontal and transverse to a forward direction of travel of the planter unit.

16. The planter unit according to claim 9, further comprising a means for biasing the attaching arm in a direction that imparts a downward force on the seed-firming wheel during operation, and an adjustment mechanism for adjusting the downward force imparted by the biasing means.

17. The planter unit according to claim 9, wherein said attaching arm comprises a pair of arms that are spaced apart with the seed-firming wheel rotatably supported therebetween.

18. The planter unit according to claim 9, further comprising a closing wheel assembly having at least one closing wheel located behind the seed-firming wheel for closing the furrow.

19. A method of firming seeds in a furrow during agricultural seeding, comprising the steps of:
provAIding a planter unit having a furrow opener, a seed guide for guiding seeds into a furrow created by the furrow opener, and a seed-firming wheel located in the furrow behind the seed guide; and
using an attaching arm which is pivotally attached at a location behind the seed-firming wheel to push the seed-firming wheel to roll along the bottom of the furrow in a forward direction for firming seeds into soil at the bottom of the furrow during operation of the planter unit.

20. The method according to claim 19, wherein said attaching arm has a forward portion on which the seed-firming wheel is rotatably supported, a rearward portion for attaching an extension spring, and an axis of rotation located between the forward and rearward portions, and further comprising the step of using the extension spring to impart an adjustable downward force on the seed-firming wheel during operation.

* * * * *